United States Patent
Takata et al.

(10) Patent No.: US 9,505,359 B2
(45) Date of Patent: Nov. 29, 2016

(54) SOUND-ABSORBING MATERIAL AND WIRE HARNESS EQUIPPED WITH SOUND-ABSORBING MATERIAL

(71) Applicants: AutoNetworks Technologies, Ltd., Tokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Yutaka Takata, Mie (JP); Shigeyuki Tanaka, Mie (JP)

(73) Assignees: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES. LTD., Yokkaichi, Mie (JP)

( * ) Notice: Subject to any disclaimer, the term of this patent is extended or adjusted under 35 U.S.C. 154(b) by 0 days.

(21) Appl. No.: 14/782,637

(22) PCT Filed: Aug. 21, 2013

(86) PCT No.: PCT/JP2013/072292
§ 371 (c)(1),
(2) Date: Oct. 6, 2015

(87) PCT Pub. No.: WO2014/174696
PCT Pub. Date: Oct. 30, 2014

(65) Prior Publication Data
US 2016/0042730 A1    Feb. 11, 2016

(30) Foreign Application Priority Data
Apr. 26, 2013    (JP) ................ 2013-093567

(51) Int. Cl.
| | | |
|---|---|---|
| *B60R 16/02* | (2006.01) | |
| *B32B 5/02* | (2006.01) | |
| *B32B 17/02* | (2006.01) | |
| *G10K 11/168* | (2006.01) | |
| *B32B 5/24* | (2006.01) | |
| *B32B 5/26* | (2006.01) | |

(52) U.S. Cl.
CPC ........... *B60R 16/0207* (2013.01); *B32B 5/022* (2013.01); *B32B 5/24* (2013.01);
(Continued)

(58) Field of Classification Search
CPC ....... B60R 16/027; B32B 5/022; B32B 5/24; B32B 5/26
USPC .......................................... 181/290
See application file for complete search history.

(56) References Cited

U.S. PATENT DOCUMENTS 6,000,959 A * 12/1999 Curtindale .......... B60R 16/0207
439/246
7,913,807 B2 * 3/2011 Gomi .................. B60R 11/0217
181/149

(Continued)

FOREIGN PATENT DOCUMENTS

| JP | 2003-19930 | 1/2003 |
|---|---|---|
| JP | 2003-216158 | 7/2003 |

(Continued)

OTHER PUBLICATIONS

International Search Report.

*Primary Examiner* — Jeremy Luks
(74) *Attorney, Agent, or Firm* — Gerald E. Hespos; Michael J. Porco; Matthew T. Hespos (57) ABSTRACT

It is aimed to provide a sound-absorbing material and a sound-absorbing-material equipped wiring harness capable of absorbing sound in a wide frequency range from a low frequency to a high frequency. A sound-absorbing material 1 is a laminated sheet in which a base material sheet 3 and a skin material sheet 2 having a smaller basis weight than the base material sheets 3 are laminated, the base material sheet 3 includes at least a first base material sheet 31 and a second base material sheet 32 and the skin material sheet 2 is arranged between the first and second base material sheets 31, 32. The sound-absorbing material 1 and a wiring harness 7 are integrated into a sound-absorbing-material equipped wiring harness 6.

7 Claims, 11 Drawing Sheets

(52) U.S. Cl.
CPC ............... *B32B 5/26* (2013.01); *B32B 17/02* (2013.01); *G10K 11/168* (2013.01); *B32B 2262/105* (2013.01); *B32B 2262/108* (2013.01); *B32B 2307/10* (2013.01); *B32B 2307/102* (2013.01); *B32B 2605/00* (2013.01); *B32B 2605/003* (2013.01)

(56) References Cited

U.S. PATENT DOCUMENTS

| | | | |
|---|---|---|---|
| 8,695,757 B2* | 4/2014 | Duval | B32B 5/22 181/286 |
| 2004/0216949 A1* | 11/2004 | Tompson | B29C 44/0461 181/204 |
| 2005/0126848 A1* | 6/2005 | Siavoshai | B60R 13/0815 181/207 |
| 2006/0021823 A1* | 2/2006 | Kohara | B32B 5/24 181/290 |
| 2006/0225952 A1 | 10/2006 | Takayasu et al. | |
| 2007/0119651 A1 | 5/2007 | Mori et al. | |
| 2015/0203058 A1* | 7/2015 | Osada | B60R 13/0243 307/9.1 |
| 2015/0232044 A1* | 8/2015 | Demo | B60R 13/08 181/290 |

FOREIGN PATENT DOCUMENTS

| | | |
|---|---|---|
| JP | 2006-256566 | 9/2006 |
| JP | 2007-152585 | 6/2007 |
| WO | 2005/019783 | 3/2005 |

\* cited by examiner

SOUND-ABSORBING MATERIAL AND WIRE HARNESS EQUIPPED WITH SOUND-ABSORBING MATERIAL

BACKGROUND

1. Field of the Invention

The present invention relates to a sound-absorbing material using non-woven fabrics and a sound-absorbing-material equipped wiring harness in which a sound-absorbing material and a wiring harness are integrated.

2. Description of the Related Art

Normally, sound-absorbing materials are provided in the interiors of automotive vehicles, houses and the like to enhance indoor silence (see, for example, Japanese Unexamined Patent Publication No. 2003-216158). Conventionally, glass wool, rock wool, porous ceramics, waste cotton and the like have been used as sound-absorbing materials. However, due to problems of the above sound-absorbing materials such as workability, safety on human body, recyclability and environmental load, non-woven fabrics have been used in recent years.

In the case of using one non-woven fabric as a sound-absorbing material, it is possible to enhance sound absorption performance in a specific frequency range. However, there has been a problem of being unable to exhibit sound absorption performance in a wide range from a low frequency to a high frequency if only one non-woven fabric is used.

The present invention seeks to solve the above problem of the conventional technology and aims to provide a sound-absorbing material and a sound-absorbing-material equipped wiring harness capable of absorbing sound in a wide frequency range from a low frequency to a high frequency.

SUMMARY OF THE INVENTION

The prevent invention is directed to a sound-absorbing material which is a laminated sheet in which a base material sheet and a skin material sheet having a smaller basis weight than the base material sheet are laminated, characterized in that the base material sheet includes at least a first base material sheet and a second base material sheet and the skin material sheet is arranged between the first and second base material sheets.

In the above sound-absorbing material, the base material sheet is preferably a non-woven fabric.

In the above sound-absorbing material, the skin material sheet is preferably a non-woven fabric.

In the above sound-absorbing material, a skin material sheet different from the skin material sheet is preferably provided at least on an outermost surface of the laminated sheet.

In the above sound-absorbing material, preferably, the basis weight of the skin material sheet is in a range of 10 to 100 g/m2 and the basis weight of the base material sheet is in a range of 100 to 600 g/m2.

A sound-absorbing-material equipped wiring harness of the present invention is characterized in that the sound-absorbing material and a wiring harness are integrated.

In the above sound-absorbing-material equipped wiring harness, the sound-absorbing material and the wiring harness are preferably integrated with the wiring harness sandwiched between the skin material sheet and the base material sheet.

The sound-absorbing material of the present invention is the laminated sheet in which the base material sheet and the skin material sheet having a smaller basis weight than the base material sheet are laminated. Since the base material sheet includes at least the first and second base material sheets and the skin material sheet is arranged between the first and second base material sheets, sound in a wide frequency range from a low frequency to a high frequency can be absorbed.

Further, the sound-absorbing-material equipped wiring harness adopts such a configuration that the above sound-absorbing material and the wiring harness are integrated. Thus, time and labor for mounting the sound-absorbing material capable of absorbing sound in a wide frequency range from a low frequency to a high frequency separately from the wiring harness can be saved.

DETAILED DESCRIPTION

Figure 1:
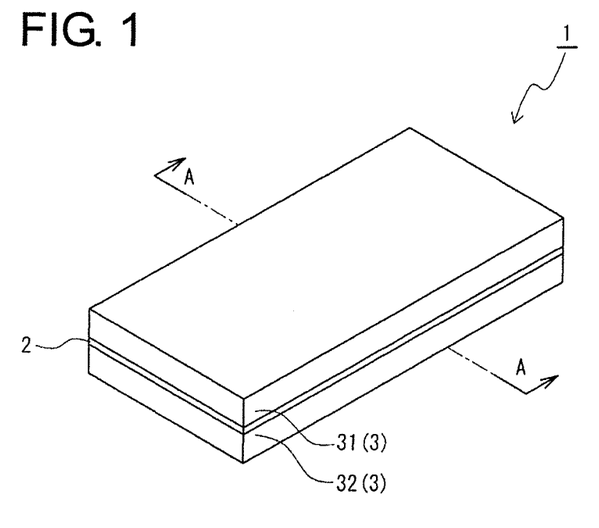
FIG. 1 is an external perspective view showing an example of a sound-absorbing material of the present invention.
Figure 2:
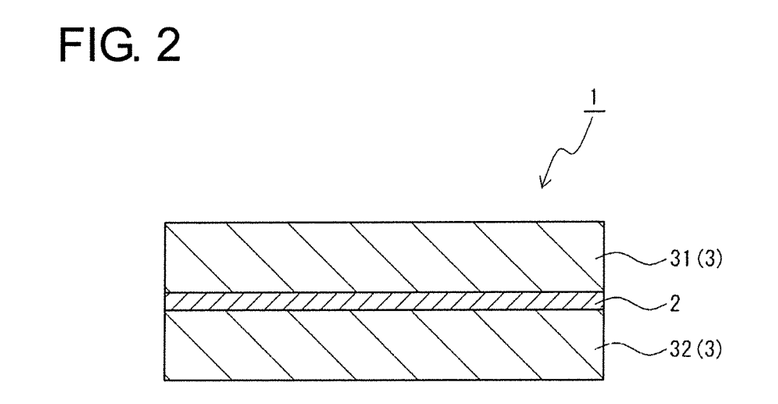
FIG. 2 is a vertical section along A-A of FIG. 1.

Hereinafter, an embodiment of the present invention is described in detail using the drawings. FIG. 1 is an external perspective view showing an example of a sound-absorbing material of the present invention, and FIG. 2 is a vertical section along A-A of FIG. 1. A sound-absorbing material 1 shown in FIGS. 1 and 2 is configured as a laminate sheet in the form of a non-woven fabric laminate in which a plurality of non-woven fabrics are laminated using non-woven fabrics as base material sheets and a skin material as a skin material sheet.

In the present invention, resin sheets, resin films, glass wool, felt or the like may be used as the skin material sheet and the base material sheets besides the above non-woven fabrics.

As shown in FIGS. 1 and 2, the sound-absorbing material 1 includes a skin material non-woven fabric 2 and base material non-woven fabrics 3 having a larger basis weight than the skin material non-woven fabric 2. Two non-woven fabrics, i.e. a first base material non-woven fabric (first base material sheet) 31 and a second base material non-woven fabric (second base material sheet) 32 are used as the base material non-woven fabrics 3. The skin material non-woven fabric 2 is arranged between the first and second base material non-woven fabrics 31, 32.

The base material non-woven fabric 3 such as the first or second base material non-woven fabric 31, 32 is formed to have a larger basis weight than the skin material non-woven fabric 2. In the sound-absorbing material of FIG. 1, the base material non-woven fabrics 3 having the same configuration were used as the first and second base material non-woven fabrics 31, 32. The basis weights of the first and second base material non-woven fabrics 31, 32 may be equal in this way, but may also be different. If the basis weights of the first and second base material non-woven fabrics 31, 32 are different, the base material non-woven fabric having a smaller basis weight has only to have a larger basis weight than the skin material non-woven fabric 2.

Due to a difference in basis weight between the skin material non-woven fabric 2 and the base material non-woven fabrics 3, absorption and reference performances of sound to be absorbed differ depending on a frequency band. The sound-absorbing material 1 can absorb sound in a wide frequency band by combining the two base material non-woven fabrics 31, 32 and the skin material non-woven fabric 2. Further, by arranging the skin material non-woven fabric 2 between the base material non-woven fabrics 31 and 32, a high sound absorbing effect is obtained in a high frequency range.

The non-woven fabrics constituting the sound-absorbing material may be merely placed one over another or may be integrated by thermal fusion, bonding or the like. Preferably, thermal fusion, needle punching or the like is adopted.

Further, the non-woven fabrics may adhere to each other without forming any clearance or slight spaces may be provided between the non-woven fabrics.

Figure 3:
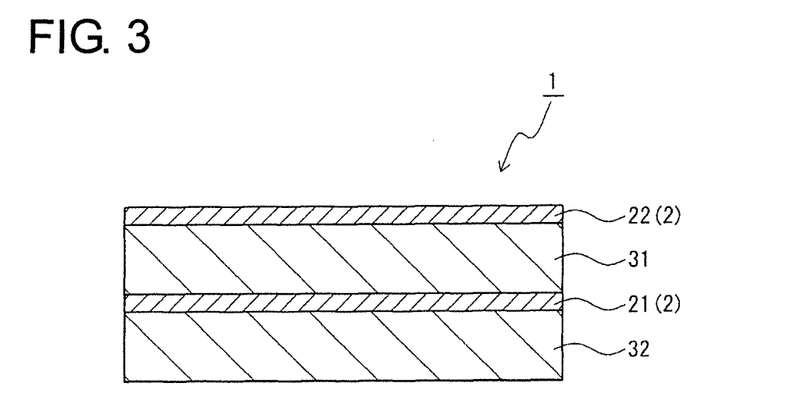
FIG. 3 is a section showing another mode of the sound-absorbing material of the present invention.

FIG. 3 is a section showing another example of the sound-absorbing material of the present invention. As shown in FIG. 3, the sound-absorbing material 1 may be configured to further include a skin material non-woven fabric 2 (second skin material non-woven fabric 22) different from the first skin material non-woven fabric 21 on an outermost surface of the non-woven fabric laminate in which the first base material non-woven fabric 31, the skin material non-woven fabric 2 (first skin material non-woven fabric 21) and the second base material non-woven fabric 32 shown in FIG. 2 are successively laminated.

The skin material non-woven fabric 2 on the outermost surface of the non-woven fabric laminate may be provided on only one outermost surface of the sound-absorbing material 1 as shown in FIG. 3, but may be provided on one and the other outermost surfaces of the sound-absorbing material so that the skin material non-woven fabrics 2 are provided on the opposite outer surfaces of the sound-absorbing material 1 although not particularly shown.

In the case of providing the second skin material non-woven fabric 21 only on one outermost surface of the non-woven fabric laminate, the second skin material non-woven fabric 22 may be provided on a surface of the first base material non-woven fabric 31 as shown in FIG. 3, but may be provided on a surface of the second base material non-woven fabric 32 although not particularly shown.

As shown in FIG. 3, a high sound absorbing effect is achieved in a low frequency band in the case of including the second skin material non-woven fabric 22 on the outermost surface of the non-woven fabric laminate.

A basis weight of the skin material non-woven fabric 2 is preferably in a range of 10 to 100 g/m2. If the basis weight of the skin material non-woven fabric 2 is excessively large, the sound absorbing effect becomes equivalent to that of general sound-absorbing materials and it may become difficult to obtain the effect of the skin material. If the basis weight of the skin material non-woven fabric 2 is excessively small, the sound absorbing effect of the skin material may not be sufficiently exhibited.

A thickness of the skin material non-woven fabric 2 is preferably in a range of 0.1 to 3 mm. If the skin material non-woven fabric 2 is excessively thick, the sound absorbing effect becomes equivalent to that of general sound-absorbing materials and it may become difficult to obtain the effect of the skin material. If the skin material non-woven fabric 2 is excessively thin, the sound absorbing effect of the skin material may not be sufficiently exhibited.

A fiber diameter of fibers used in the skin material non-woven fabric 2 is preferably in a range of 1 to 50 μm. If the fiber diameter is excessively small, the sound absorption performance is high, but the material may become brittle. Further, if the fiber diameter is excessively large, the sound absorbing effect of the skin material non-woven fabric 2 may not be exhibited.

The shape of the fibers used in the skin material non-woven fabric 2 may be of a core-sheath type, a cylindrical type, a hollow type or a side-by-side type or fibers having a modified cross-section different in shape from normal fibers may be used. The fibers used in the skin material non-woven fabric 2 may be either short fibers or long fibers.

Examples of the base material of the fibers of the skin material non-woven fabric 2 include polyesters such as polyethylene terephthalate and polybutylene terephthalate, polyolefin, nylon, polyamide, polyvinyl chloride, rayon, acryl, acrylonitrile, cellulose, kenaf and glass.

A non-woven fabric produced by needle punching, spun bonding, spun lacing, melt blowing or the like can be used as the skin material non-woven fabric 2.

A basis weight of the base material non-woven fabric 3 is preferably in a range of 100 to 600 g/m2. There is a tendency that the sound absorption coefficient in the entire frequency band is high if the basis weight of the base material non-woven fabric 3 is large and the sound absorption coefficient in the entire frequency band is low if the basis weight of the base material non-woven fabric 3 is small.

A thickness of the base material non-woven fabric 3 is preferably in a range of 5 to 40 mm. There is a tendency that the sound absorption coefficient at low frequencies is high if the base material non-woven fabric 3 is thick and the sound absorption coefficient at high frequencies is high if the base material non-woven fabric 3 is thin. An absorption peak in the frequency band changes by changing the thickness of the base material non-woven fabric 3. The thickness of the base material non-woven fabric 3 can be appropriately selected according to the frequency range of sound desired to be absorbed.

Further, a fiber diameter of fibers used in the base material non-woven fabric 3 is preferably in a range of 9 to 100 μm. There is a tendency that the sound absorption performance is high if the fiber diameter of the fibers used in the base material non-woven fabric 3 is small and the sound absorption performance is low if the fiber diameter is large.

The shape of the fibers used in the base material non-woven fabric 3 may be of a core-sheath type, a cylindrical type, a hollow type or a side-by-side type or fibers having a modified cross-section different in shape from normal fibers may be used. The fibers used in the base material non-woven fabric 3 may be either short fibers or long fibers.

Examples of the base material of the fibers of the base material non-woven fabric 3 include polyesters such as polyethylene terephthalate and polybutylene terephthalate, polyolefin, nylon, polyamide, polyvinyl chloride, rayon, acryl, acrylonitrile, cellulose, kenaf and glass.

A non-woven fabric produced by needle punching, spun bonding, spun lacing, melt blowing or the like can be used as the base material non-woven fabric 3.

The basis weight of each non-woven fabric constituting the skin material non-woven fabric 2 or the base material non-woven fabric 3 can be appropriately selected according to the sound absorption coefficient in a desired frequency band or the like.

In the case of installing the sound-absorbing material 1 in a vehicle or the like, the skin material non-woven fabric 2 arranged closest to a sound source side is preferably configured to have a highest density. This is because sound incident on the sound-absorbing material 1 and reflected inside can be preventing from coming out again toward the sound source side through the skin material non-woven fabric 2.

A density of a non-woven fabric is an apparent density (bulk density) and can be obtained from the values of a basis weight and a thickness. The basis weight can be measured using a test method of JIS L1913 for obtaining a mass per unit area. Further, a thickness at the time of pressing at a pressure of 0.1 kPa can be used.

Figure 4:
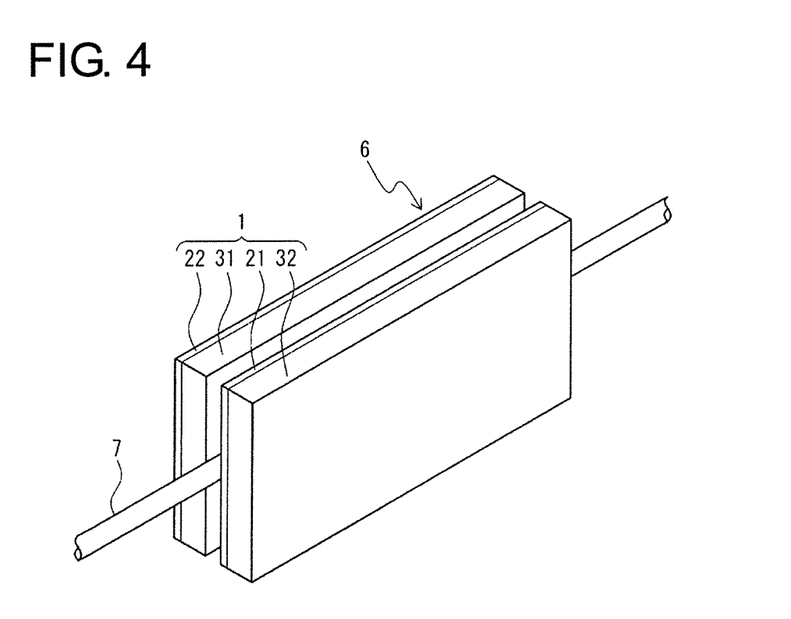
FIG. 4 is an external perspective view showing an example of a sound-absorbing-material equipped wiring harness of the present invention.

FIG. 4 is an external perspective view showing an example of a sound-absorbing-material equipped wiring harness of the present invention. As shown in FIG. 4, a sound-absorbing-material equipped wiring harness 6 is a combination example of the sound-absorbing material 1 shown in FIG. 3 and a wiring harness 7. The sound-absorbing-material equipped wiring harness 6 is an integrated assembly of the sound-absorbing material 1 and the wiring harness 7. The wiring harness 7 is integrated with a part thereof sandwiched between the first base material non-woven fabric 31 and the first skin material non-woven fabric 21 of the sound-absorbing material 1.

A fixed position of the wiring harness 7 in the sound-absorbing-material equipped wiring harness 6 is not particularly limited to the above position. The wiring harness 7 may be arranged at any position of the non-woven fabric laminate constituting the sound-absorbing material 1. In the case of sandwiching the wiring harness by non-woven fabrics so that the wiring harness 7 is located in the non-woven fabric laminate of the sound-absorbing material 1 in this way, a shock absorbing effect by the non-woven fabrics is obtained.

The wiring harness 7 may be a wiring harness in which a wire bundle formed by bundling a plurality of wires, in each of which a core is covered around by an insulator, is covered around by a wiring harness protecting member. The wiring harness 7 is not particularly limited to the above configuration and may be composed of only one wire or a plurality of wires may be bundled by a tying member or the like without using the wiring harness protecting member.

A method for bonding the above wiring harness protecting member or the like and the sound-absorbing material via an adhesive is cited as a means for fixing and integrating the wiring harness 7 to and with the sound-absorbing material 1. Further, if the wiring harness 7 is sandwiched between the non-woven fabrics 31, 21 as shown in FIG. 4, it is also possible to thermally fuse the wiring harness protecting member and the non-woven fabrics. Further, although not particularly shown, the wiring harness 7 may be fixed to and integrated with the sound-absorbing material 1 using a separate mounting member or the like. The wiring harness 7 may be fixed to any one of the first skin material non-woven fabric 21, the second skin material non-woven fabric 22, the first base material non-woven fabric 31 and the second base material non-woven fabric 32.

Figure 5:
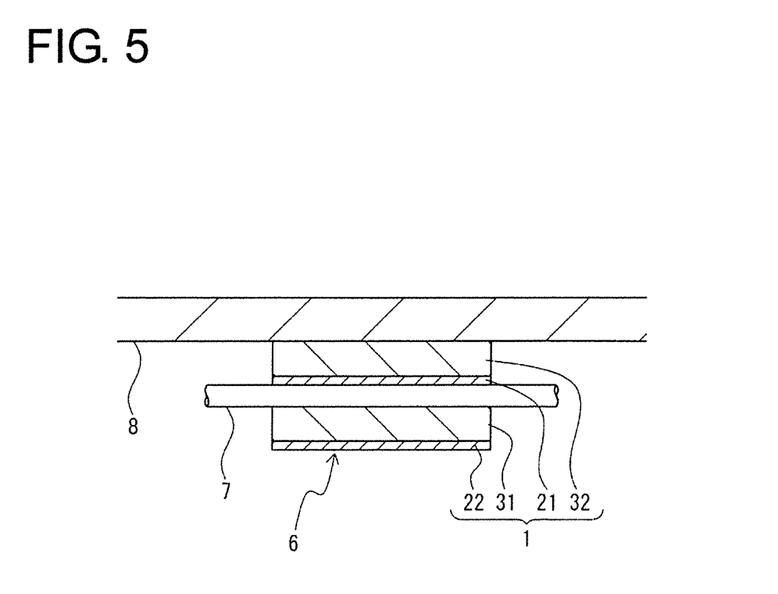
FIG. 5 is a section showing a state where the sound-absorbing-material equipped wiring harness is mounted on a vehicle body.
Figure 6A:
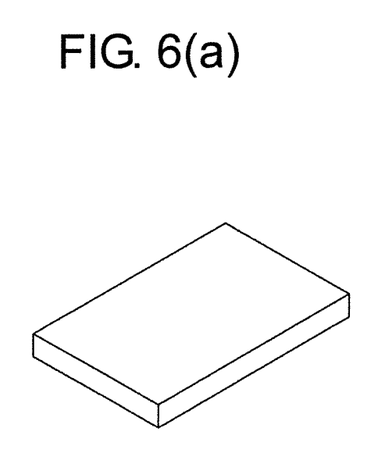
FIGS. 6(a) to 6(d) are external perspective views showing sound-absorbing materials of Comparative Examples 1 to 4.
Figure 6B:
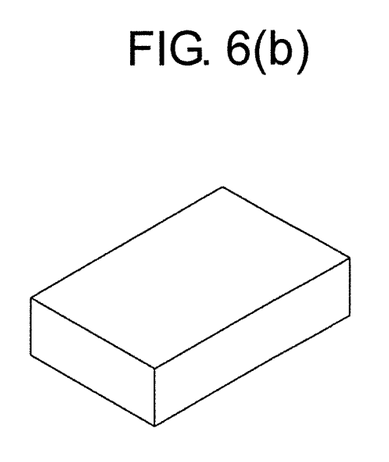
Figure 6C:
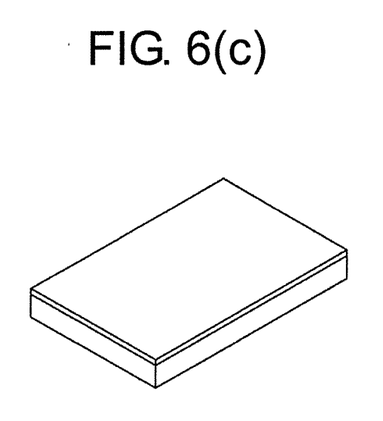
Figure 6D:
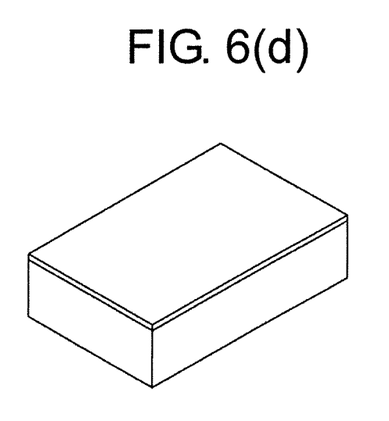

FIG. 5 is a section showing a state where the sound-absorbing-material equipped wiring harness is mounted on a vehicle body. As shown in FIG. 5, the sound-absorbing-material equipped wiring harness 6 is fixed in a state where one surface of the sound-absorbing material 1 is in contact with a vehicle body 8. An upward direction in FIG. 5 is a direction toward a sound source such as an engine compartment and a downward direction in FIG. 5 is a direction toward vehicle interior. To mount the sound-absorbing material 1 on the vehicle body 8, either the wiring harness 7 or the sound-absorbing material 1 or both the wiring harness 7 and the sound-absorbing material 1 can be fixed to a supporting member (not shown) installed on the vehicle body 8.

The sound-absorbing material 1 or the sound-absorbing-material equipped wiring harness 6 can be installed at a position between an engine compartment and the vehicle interior of an automotive vehicle where it is desired to shut off noise such as in a dashboard of the automotive vehicle or the like.

The sound-absorbing material of the present invention can be suitably used as a sound-absorbing material for vehicle such as automotive vehicle. The sound-absorbing-material equipped wiring harness of the present invention can be suitably used as a wiring harness for automotive vehicle.

EXAMPLES

Examples of the present invention and Comparative Examples are described below.

Examples 1 and 2, Comparative Examples 1 to 4

Figure 7:
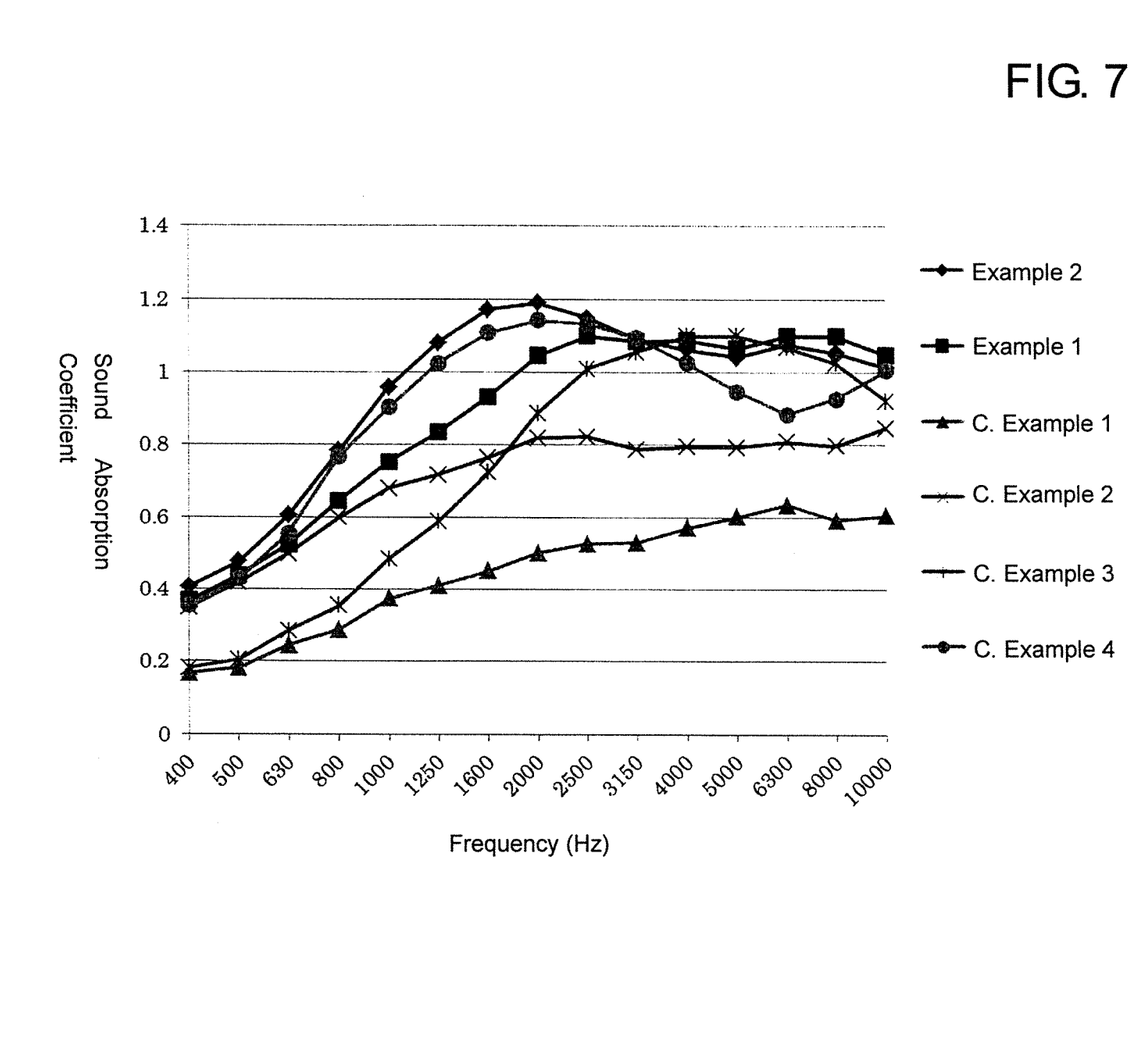
FIG. 7 is a graph showing a measurement result on reverberant sound absorption coefficients of Examples 1 and 2 and Comparative Examples 1 to 4.

The sound-absorbing material shown in FIG. 1 and having the following configuration was treated as Example 1 and the sound-absorbing material shown in FIG. 3 and having the following configuration was treated as Example 2. Sound-absorbing materials configured as shown in FIGS. 6(*a*) to 6(*d*) were respectively treated as sound-absorbing materials of Comparative Examples 1, 2, 3 and 4. A reverberant sound absorption coefficient was measured and sound absorption performance was evaluated for the sound-absorbing materials of Examples and Comparative Examples. A measurement result on the sound absorption coefficient is shown in FIG. 7. The details of the configurations of the sound-absorbing materials of Examples and Comparative Examples and a reverberant sound absorption coefficient test method are as follows.

The arrangement of the non-woven fabrics from the sound source side is as follows in each sound-absorbing material.

Example 1: base material non-woven fabric (10 mm in thickness)/skin material non-woven fabric (1 mm in thickness)/base material non-woven fabric (10 mm in thickness), 21 mm in total thickness Example 2: skin material non-woven fabric (1 mm in thickness)/base material non-woven fabric (10 mm in thickness)/skin material non-woven fabric (1 mm in thickness)/base material non-woven fabric (10 mm in thickness), 22 mm in total thickness Comparative Example 1: base material non-woven fabric (10 mm in thickness)

Comparative Example 2: base material non-woven fabric (20 mm in thickness)
Comparative Example 3: skin material non-woven fabric (1 mm in thickness)/base material non-woven fabric (10 mm in thickness), 11 mm in total thickness
Comparative Example 4: skin material non-woven fabric (1 mm in thickness)/base material non-woven fabric (20 mm in thickness), 21 mm in total thickness The skin material non-woven fabric(s) and the base material non-woven fabric(s) were bonded and integrated into a sound-absorbing material at 180° C. after being laminated.

Figure 8:
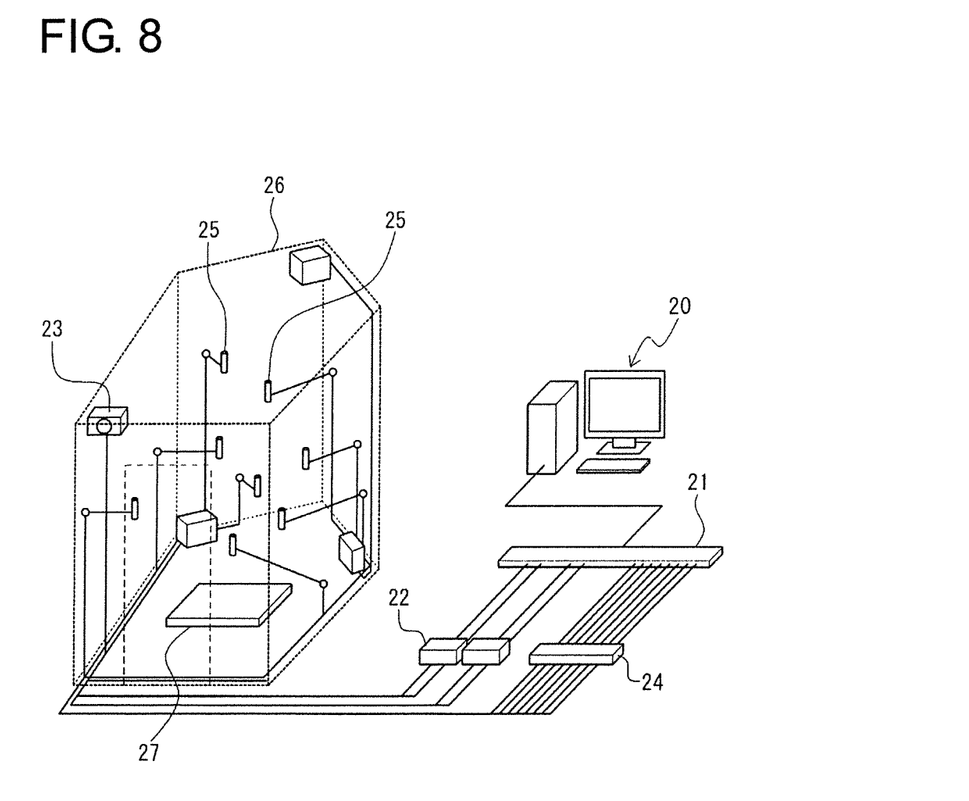
FIG. 8 is a diagram showing a reverberant sound absorption coefficient measurement method.

Skin Material Non-Woven Fabric
  Type of fibers: polyolefin long fibers, 4 μm in fiber diameter
  Fabrication method: fabricated by needle punching or spun bonding
  Basis weight: 50 g/m²
  Thickness: 1 mm Base Material Non-Woven Fabric
  Type of fibers: polyester short fibers, 20 μm in fiber diameter
  Fabrication method: fabricated by needle punching or spun bonding
  Basis weight: 300 g/m²
  Thickness: 10 mm Reverberant Sound Absorption Coefficient Measurement Method The sound absorption coefficient was measured in accordance with a reverberant sound absorption coefficient measurement method of JIS A 1409 and obtained by a calculation expression shown in the following equation (1). The larger the value of the sound absorption coefficient, the better the sound absorption. As shown in FIG. 8, a reverberant chamber 26 in which a speaker 23 connected to a personal computer 20 via a power amplifier 22 and an audio interface 21 and a microphone 25 connected to the personal computer 20 via a microphone amplifier 24 and the audio interface 21 were arranged at predetermined positions was used for the test. First, electrical noise sound was emitted from the speaker 23 in a state where a sample (sound-absorbing material) was not arranged in the reverberation chamber 26, the sound was stopped and a sound attenuation process was measured by the microphone 25. A time during which the sound was attenuated in a range of −5 to −35 dB was obtained as a reverberation time $T_1$ from a measured attenuation curve. The measurement was conducted for each ⅓ octave band having a center frequency of 400 Hz to 10000 Hz. Subsequently, a sample 27 was arranged on a floor surface of the reverberation chamber 26 and a reverberation time $T_2$ was obtained in a manner similar to the above. A sound absorption coefficient (as) was calculated by the following equation (1).

$$\alpha_s \text{ (sound absorption coefficient)} = A/S \quad (1)$$

S: Area of the sample (m²)
A: Equivalent sound absorption area (m²), obtained by the following equation (2)

$$A = 55.3 \ V/c \cdot [1/T_2 - 1/T_1] \quad (2)$$

V: Volume of the reverberation chamber in the state where no sample is set (m³)
c: sound velocity in air (m/s)
$T_1$: Reverberation time (s) of the reverberation chamber in the state where no sample is set (s)
$T_2$: Reverberation time (s) of the reverberation chamber in the state where the sample is set (s)

Concerning Sound Absorption Coefficient Measurement Result

As shown in the graph of FIG. 7, Comparative Example 1 composed only of the base material non-woven fabric had a lowest sound absorption coefficient in the entire frequency range. Comparative Example 2 in which only the thickness of the base material non-woven fabric of Comparative Example 1 was doubled had an improved sound absorption coefficient in the entire frequency range, but Example 1 in which two of the same base material non-woven fabrics as in Comparative Example 1 were used and the skin material non-woven fabric was sandwiched between the base material non-woven fabrics indicated a high sound absorption coefficient as a whole as compared with Comparative Example 2. Further, Example 1 had a drastically better sound absorption coefficient in a high frequency range than in Comparative Example 2.

Further, Comparative Example 3 had an improved sound absorption coefficient in the high frequency range due to the lamination of the skin material non-woven fabric on the base material non-woven fabric of Comparative Example 1, but the sound absorption coefficient in a low frequency range did not change very much. In Comparative Example 4, the thickness of the base material non-woven fabric of Comparative Example 3 was doubled and the sound absorption coefficient in the low frequency range was improved, but the sound absorption coefficient in the high frequency range was lower than in Example 1.

As shown in FIG. 7, Examples 1 and 2 were good in sound absorption coefficient over the entire frequency range from the low frequency range to the high frequency range as compared with Comparative Examples 1 to 4. Further, as compared with Example 1, Example 2 had a further improved sound absorption coefficient at low frequencies due to the presence of the skin material non-woven fabric also on the outer surface.

Experimental Examples

A relationship between the basis weight of each non-woven fabric and the sound absorption performance was tested for the sound-absorbing material 1 using the non-woven fabric laminate as shown in FIG. 3 in which the second skin material non-woven fabric 22, the first base material non-woven fabric 31, the first skin material non-woven fabric 21 and the second base material non-woven fabric 32 were successively laminated. The same non-woven fabrics were used as the first and second base material non-woven fabrics 31, 32. Further, the same non-woven fabrics were used as the first and second skin material non-woven fabrics 21, 22. Tests on the sound absorption performance were conducted for a relationship between the basis weight of the base material non-woven fabrics and the sound absorption coefficient shown in Table 1 (Experimental Examples 1-1 to 1-6) and for a relationship between the basis weight of the skin material non-woven fabrics and the sound absorption coefficient shown in Table 2. A test result is shown in Tables 1 and 2.

The sound absorption performance of the above experimental examples was evaluated by measuring a normal incidence sound absorption coefficient. The detail of a normal incidence sound absorption coefficient test method is as follows. Further, the base material non-woven fabrics and the skin material non-woven fabrics used in the test had the same configurations as those in Example 1 except the basis weights.

Normal Incidence Sound Absorption Coefficient Test Method

Figure 9:
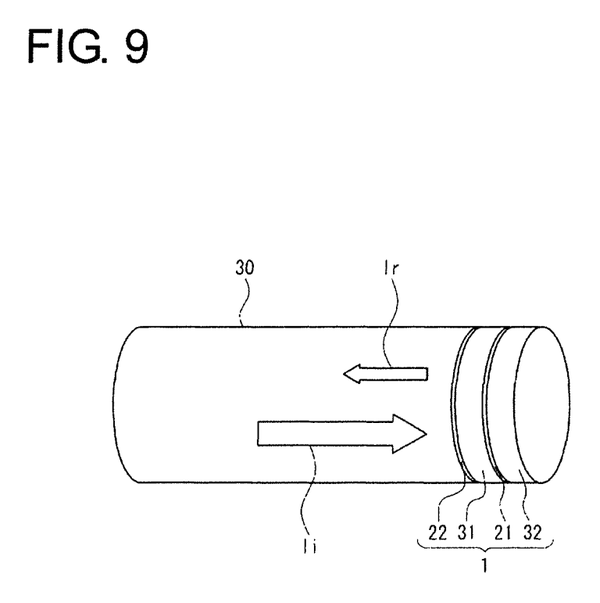
FIG. 9 is a diagram showing a normal incidence sound absorption coefficient measurement method.

In accordance with JIS A 1405-2, the sound absorption coefficients (normal incidence sound absorption coefficients) at 500 to 5000 Hz were measured by a normal incidence method. FIG. 9 is a diagram showing the normal incidence sound absorption coefficient test method. As shown in FIG. 9, the sound-absorbing material 1 was so arranged in a sound-absorbing tube 30 that the skin material non-woven fabric 22 thereof faces a sound source. A normal incidence sound absorption coefficient α is expressed as a ratio of incident sound of a normally incident plane wave (Ii) and sound which is incident on a surface of a sample, but does not return (Ii−Ir) as shown in the following equation (3). The above Ir is reflection sound. Specifically, the normal incidence sound absorption coefficient can be obtained by arranging the sample in an acoustic tube and measuring the incident sound (Ii) and the reflection sound (Ir) by a microphone.

$$\alpha=(Ii-Ir)/(Ii) \qquad (3)$$

As a rough indication of the above normal incidence sound absorption coefficient, it can be judged that satisfactory sound absorption performance can be exhibited when the sound absorption coefficient at 1000 Hz is not lower than 0.25, when the sound absorption coefficient at 2000 Hz is not lower than 0.4, when the sound absorption coefficient at 3000 Hz is not lower than 0.6 and when the sound absorption coefficient at 4000 Hz is not lower than 0.8.

A wiring harness for automotive vehicle is laid in every clearance of an automotive vehicle. The wiring harness for automotive vehicle is often mounted in a place where the wiring harness collides with the vehicle in design. In such a place, a member for preventing the generation of sound caused by the collision of a vehicle body of the automotive vehicle and the wiring harness has been mounted. This member is generally called a silencing material for wiring harness.

Conventionally, a member made of a material different from that of a sound-absorbing material for automotive vehicle has been used as a silencing material for wiring

TABLE 1

| | | Experiment Number | | | | | |
|---|---|---|---|---|---|---|---|
| Item | | 1-1 | 1-2 | 1-3 | 1-4 | 1-5 | 1-6 |
| Configuration of Non-Woven Fabric Laminate | | | | | | | |
| Skin Material | Basis Weight (g/m²) | 50 | 50 | 50 | 50 | 50 | 50 |
| Base Material | Basis Weight (g/m²) | 50 | 100 | 200 | 400 | 600 | 800 |
| | Thickness (mm) | 3 | 5 | 10 | 25 | 40 | 50 |
| Test Result | | | | | | | |
| Sound Absorption Coefficient | 1000 Hz band | 0.15 | 0.30 | 0.36 | 0.40 | 0.45 | 0.56 |
| | 2000 Hz band | 0.29 | 0.49 | 0.55 | 0.58 | 0.75 | 0.89 |
| | 3000 Hz band | 0.55 | 0.79 | 0.88 | 0.95 | 0.99 | 0.99 |
| | 4000 Hz band | 0.64 | 0.88 | 0.95 | 1.00 | 1.00 | 0.75 |

TABLE 2

| | | Experiment Number | | | | | |
|---|---|---|---|---|---|---|---|
| Item | | 2-1 | 2-2 | 2-3 | 2-4 | 2-5 | 2-6 |
| Configuration of Non-Woven Fabric Laminate | | | | | | | |
| Skin Material | Basis Weight (g/m²) | 5 | 10 | 30 | 50 | 100 | 150 |
| Base Material | Basis Weight (g/m²) | 100 | 100 | 100 | 100 | 100 | 100 |
| | Thickness (mm) | 5 | 5 | 5 | 5 | 5 | 5 |
| Test Result | | | | | | | |
| Sound Absorption Coefficient | 1000 Hz band | 0.15 | 0.30 | 0.30 | 0.30 | 0.30 | 0.30 |
| | 2000 Hz band | 0.29 | 0.45 | 0.45 | 0.49 | 0.49 | 0.49 |
| | 3000 Hz band | 0.55 | 0.75 | 0.70 | 0.79 | 0.79 | 0.79 |
| | 4000 Hz band | 0.65 | 0.80 | 0.82 | 0.88 | 0.88 | 0.88 |

As shown in Table 1, the sound absorption coefficient in the frequency band of 1000 to 4000 Hz was generally satisfactory when the basis weight of the base material was in a range of 100 to 600 g/m2. Further, as shown in Table 2, the sound absorption coefficient in the frequency band of 1000 to 4000 Hz was generally satisfactory when the basis weight of the skin material was in a range of 10 to 150 g/m2.

harness and the silencing material has been mounted separately from the sound-absorbing material for automotive vehicle. In this way, a sound absorbing function and a silencing function have been given to a vehicle using different materials. Contrary to this, since having an effect as a silencing material, the sound-absorbing material of the present invention can additionally provide a function as the above silencing material for wiring harness in the case of being used as the sound-absorbing material for wiring harness. That the sound-absorbing material of the present invention has the functions as the sound-absorbing material for wiring harness and the silencing material for wiring harness is shown using the following Examples 3, 4 and Comparative Examples 5, 6.

Example 3 had the laminated structure of non-woven fabrics shown in FIG. 3 and Example 4 had the laminated structure of non-woven fabrics shown in FIG. 1. After being laminated, the skin material non-woven fabric(s) and the base material non-woven fabrics were bonded and united into a sound-absorbing material at 180° C. Further, Comparative Examples 3, 4 used commercially available products called silencing materials for automotive vehicle. The detail is as follows.

Example 3: skin material non-woven fabric (1 mm in thickness)/base material non-woven fabric (10 mm in thickness)/skin material non-woven fabric (1 mm in thickness)/base material non-woven fabric (10 mm in thickness), 22 mm in total thickness Example 4: base material non-woven fabric (10 mm in thickness)/skin material non-woven fabric (1 mm in thickness)/base material non-woven fabric (10 mm in thickness), 21 mm in total thickness The details of the skin material non-woven fabrics and the base material non-woven fabrics used in Examples 3, 4 are as follows.
Skin Material Non-Woven Fabric
  Type of fibers: polypropylene fibers, 5 to 10 μm in fiber diameter (diameter)
  Fabrication method: fabricated by spun bonding
  Basis weight: 50 g/m$^2$
  Thickness: 1 mm
Base Material Non-Woven Fabric
  Type of fibers: polyester fibers, 14 μm in fiber diameter (diameter)
  Fabrication method: fabricated by needle punching
  Basis weight: 300 g/m$^2$
  Thickness: 10 mm
  Comparative Example 3: Commercially available silencing material for automotive vehicle: produced by Nitto Denko Corporation, product name "Eptsealer No. 685"
  Comparative Example 4: Commercially available silencing material for automotive vehicle: produced by Federal-Mogul Holdings Corporation, product name "Twist Tube" (formed of PET fibers)

Figure 10:
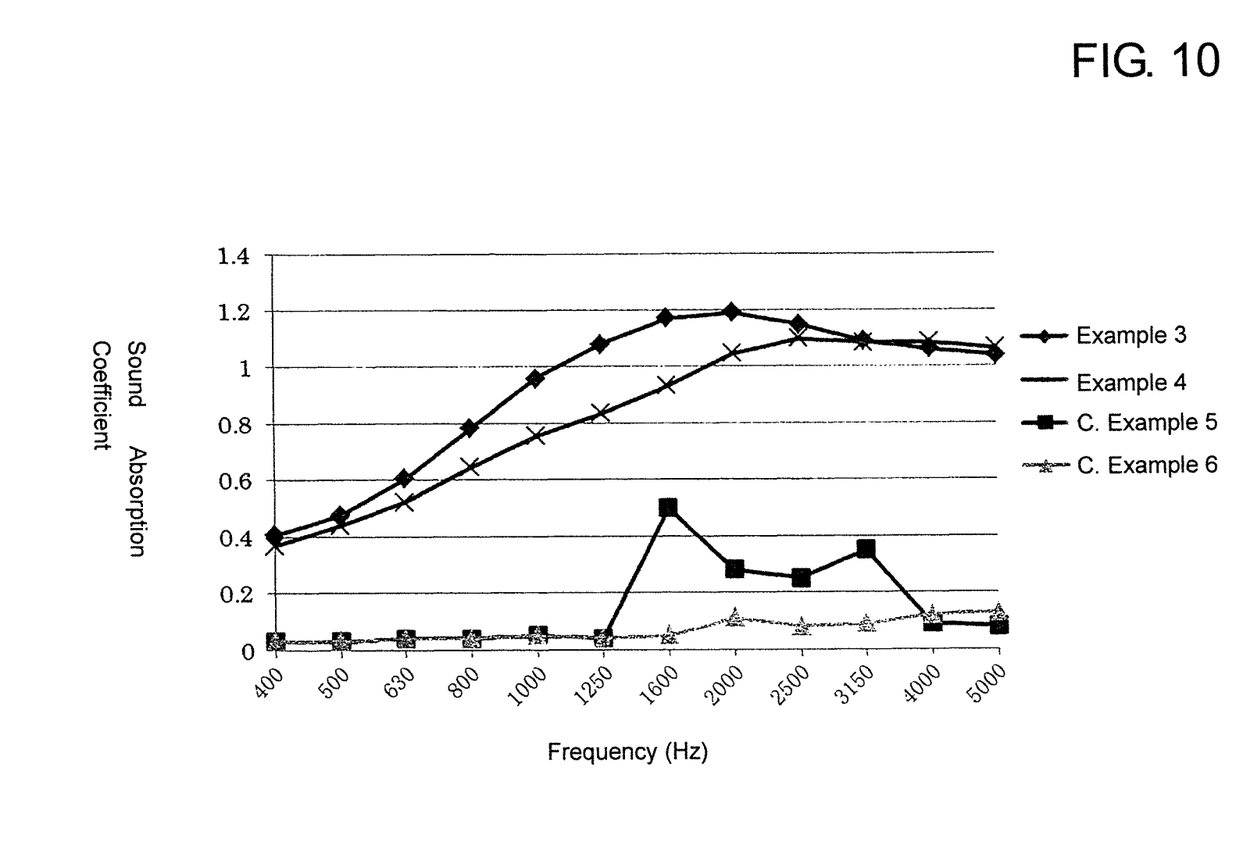
FIG. 10 is a graph showing a measurement result on reverberant sound absorption coefficients of Examples 3 and 4 and Comparative Examples 5 and 6.

Sound absorption performance and silencing performance were evaluated for the sound-absorbing materials of Examples 3, 4 and Comparative Examples 5, 6. The sound absorption performance was measured by measuring a sound absorption coefficient by the reverberant sound absorption coefficient test as in Example 1. A measurement result is shown in a graph of FIG. 10. As shown in FIG. 10, Examples 3, 4 had better sound absorption performance than Comparative Examples 5, 6.

Figure 11A:
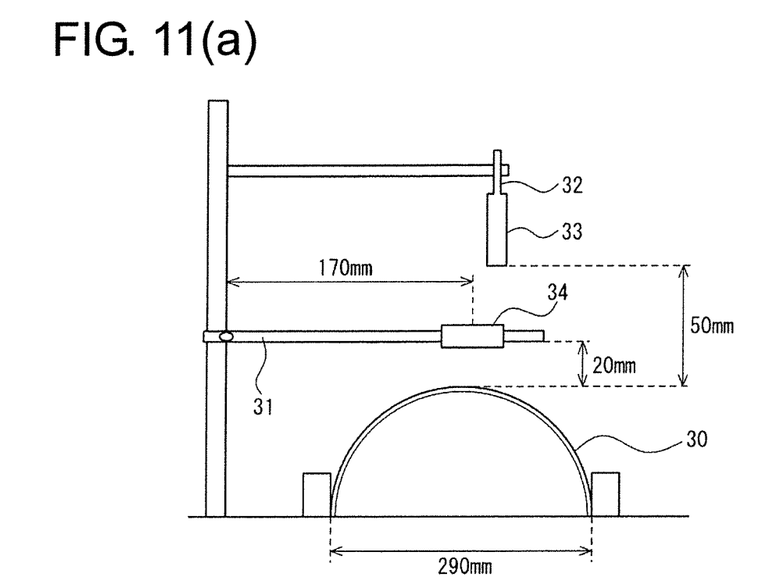
FIGS. 11(a) and 11(b) are diagrams showing a silencing performance measurement method.
Figure 11B:
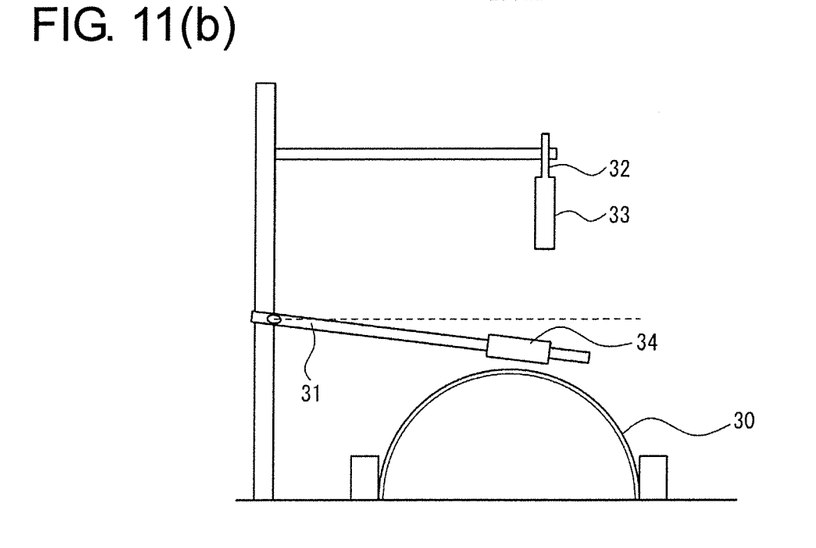

The silencing performance of Examples 3, 4 and Comparative Examples 5, 6 was measured by LV312 which is an integrated standard among German car manufacturers. The detail of a measurement method for the silencing performance is as follows.
Silencing Performance Evaluation Method As shown in FIG. 11(a), a steel rod 31 was dropped at a load of 0.16 N from a position 20 mm above an aluminum plate 30 in a state where the aluminum plate 30 having a thickness of 3 mm was curved within a length of 290 mm (FIG. 11(b), whereby the steel rod 31 was caused to collide with the aluminum plate 30 and collision sound at the time of collision was measured by a microphone 33 of a noise meter 32 arranged at a position 50 mm above the aluminum plate 30. The collision sound was measured by causing the steel rod 31 to collide with the aluminum plate 30 in a state where a sound-absorbing material or silencing material sample 34 was wound around a colliding part of the steel rod 31 with the aluminum plate 30 or in an unwound state. A measurement condition of the noise meter 32 is to conduct a measurement for 3 sec. at an A-characteristic frequency weighted sound pressure level and calculate an overall value. The measurements were conducted in a sound insulated box so as not to pick up noise around. Each measurement was repeated three times and an average value thereof was set as a sound pressure (dB). A measurement result is shown in Table 3.

Silencing property was evaluated to be good (○) at and above 10 dB, slightly defective (Δ) at or above 1 dB and below 10 dB and defective (x) below 1 dB.

TABLE 3

| Sample | Sound Pressure (dB) | Evaluation on Silencing Property |
|---|---|---|
| Background Noise | 45.6 | — |
| Without Silencing Member | 94.2 | — |
| Example 3 | 51.8 | ○ |
| Example 4 | 52.4 | ○ |
| Comparative Example 5 | 75.1 | ○ |
| Comparative Example 6 | 90.0 | Δ |

As shown in Table 3, it was confirmed that Examples 3, 4 was good in evaluation on the silencing property and had silencing performance. Further, Comparative Example 5 was good in silencing property, but had a higher sound pressure than Examples 3, 4. Further, Comparative Example 6 had a lower sound pressure than the case without the silencing material, but was slightly defective in evaluation on the silencing property.

Although the examples of the present invention have been described in detail above, the present invention is not limited to the above examples at all and various changes can be made without departing from the gist of the present invention.

The sound-absorbing material of the present invention may be composed of three or more base material non-woven fabrics or may be composed of three or more skin material non-woven fabrics.

The invention claimed is:
1. A sound-absorbing material equipped wiring harness comprising:
  a laminated sound absorbing material that includes:
    a first non-woven fabric base material sheet having a first basis weight and comprised of a plurality of first fibers having a first diameter;
    a second non-woven fabric base material sheet having a second basis weight and comprised of a plurality of second fibers having a second diameter;
    a non-woven fabric skin material sheet laminated between the first and second base material sheets, the skin material sheet having a third basis weight smaller than the first and second basis weights and comprised of a plurality of third fibers having a third diameter different than the first and second diameters; and the sound-absorbing material equipped wiring harness further including:
    a wiring harness sandwiched between the skin material sheet and at least one of the base material sheets.

2. The sound-absorbing material equipped wiring harness of claim 1, wherein the skin material sheet laminated between the first and second base material sheets is a first skin material sheet, the sound-absorbing material equipped wiring harness further comprising a second skin material sheet different from the first skin material sheet, the second skin material sheet being provided at least on an outermost surface of the laminated sound absorbing material.

3. The sound-absorbing material equipped wiring harness of claim 1, wherein the third basis weight of the skin material sheet is in a range of 10 to 100 g/m2 and the first and second basis weights of the first and second base material sheets are in a range of 100 to 600 g/m2.

4. The sound-absorbing material equipped wiring harness of claim 1, wherein the first basis weight and the second basis weight are equal to each other.

5. The sound-absorbing material equipped wiring harness of claim 1, wherein the first basis weight and the second basis weight are different from each other.

6. The sound-absorbing material equipped wiring harness of claim 1, wherein the first diameter and the second diameter are equal to each other.

7. The sound-absorbing material equipped wiring harness of claim 1, wherein the first diameter and the second diameter are different from each other.

\* \* \* \* \*